Nov. 1, 1932.  N. C. CHRISTENSEN  1,886,164
APPARATUS FOR COMPRESSING GASES
Filed March 18, 1930    2 Sheets-Sheet 1
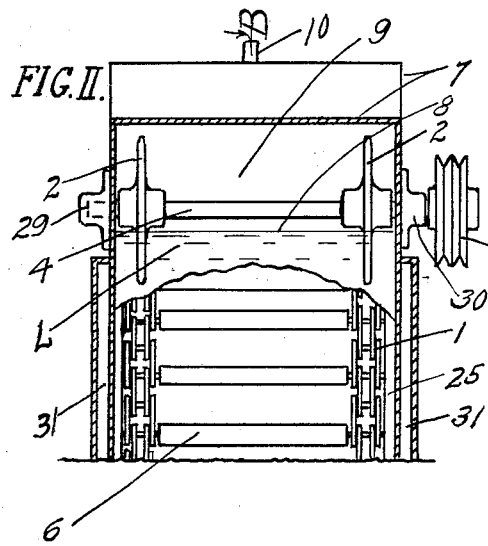
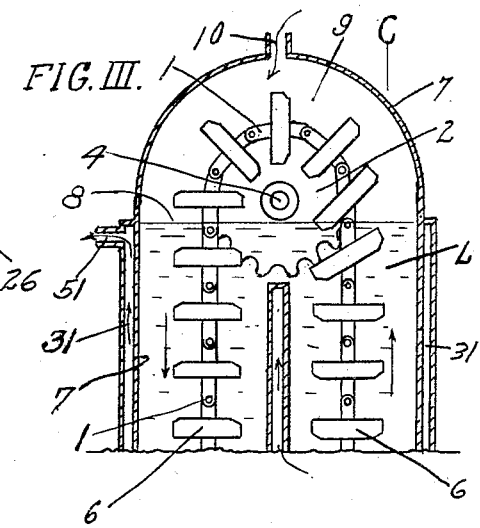
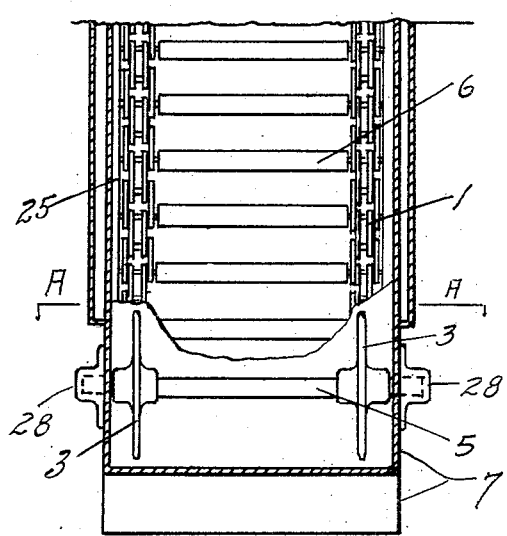
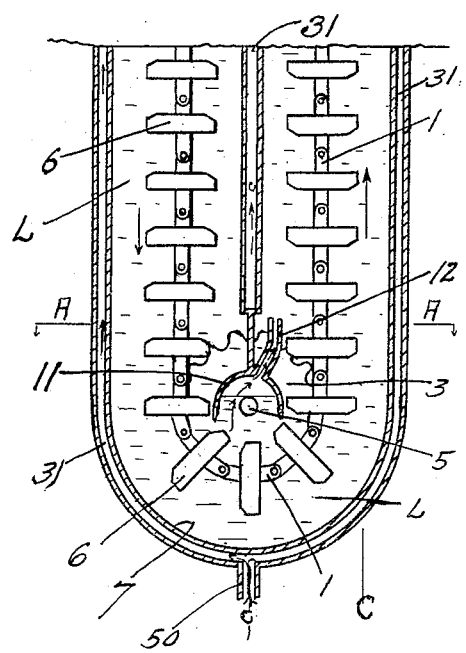
Niels C. Christensen,
INVENTOR.

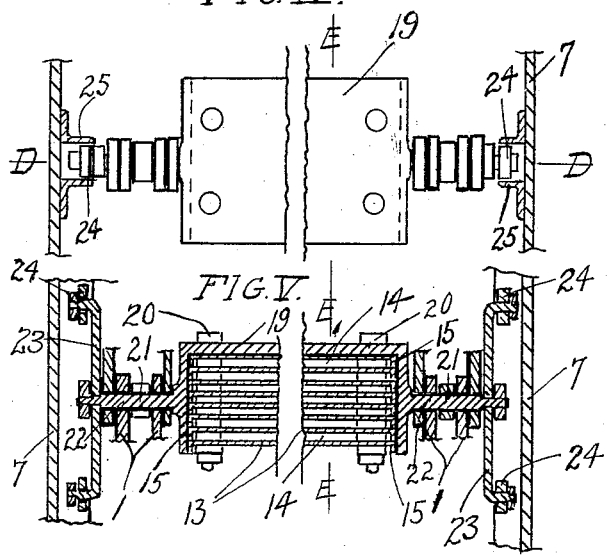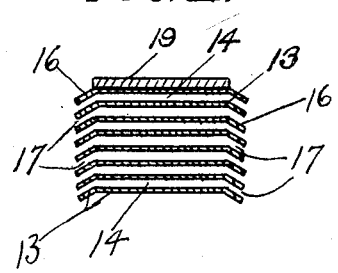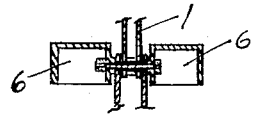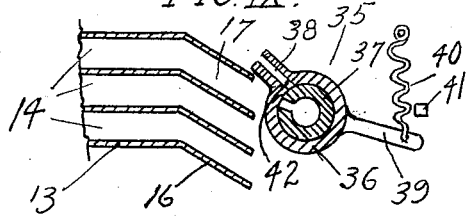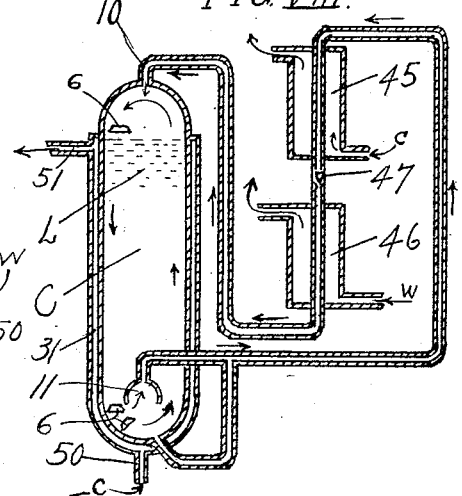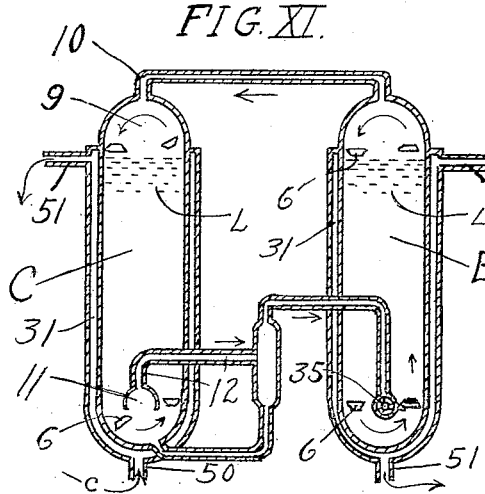

Patented Nov. 1, 1932

1,886,164

UNITED STATES PATENT OFFICE

NIELS C. CHRISTENSEN, OF SALT LAKE CITY, UTAH

APPARATUS FOR COMPRESSING GASES

Application filed March 18, 1930. Serial No. 436,912.

This invention relates to a new method and apparatus for the compression of gases (or vapors) by the application of mechanical power and also for the generation of mechanical power by the expansion of gases or vapors. The invention relates especially to methods and apparatus for the isothermal or substantially isothermal compression and expansion of gases, and the greatest value and importance of the invention resides in the fact that by this method and apparatus substantially or approximately isothermal compression and expansion of gaseous media may be secured.

As is well known to mechanical engineers engaged in the fields of power generation, air compression etc., a practical and efficient method and apparatus for securing substantially isothermal compression of gaseous media, would bring about a revolutionary improvement in these and related fields of mechanical engineering. For example, the cost of compressing air for various purposes would be considerably reduced, as would also the cost of compressing other gases for storage, liquefaction, refrigeration, etc. The production of sub-atmospheric pressures for different purposes would also be simplified and cheapened, and in this field my method and apparatus is especially applicable.

Though such economies and improvements as mentioned above are of great value, they are of relatively small importance as compared with the revolutionary improvement in the efficiency of power generation from the application of heat to gaseous working media which may be brought about by an efficient and practical method of isothermal compression of these media. Such an invention would make possible a revolutionary improvement in the thermal efficiency of various types of heat engines operating with various cycles upon gaseous working media.

My invention may also be used for substantially isothermal expansion of gaseous media but its value in this field is relatively small compared with its value for isothermal compression.

Though the greatest value of my invention lies in the possibility of securing substantially isothermal compression (and expansion) both the apparatus and method of its use may be modified so that the compression and expansion may approach adiabatic or be between these two extremes.

The method of compression used in my invention utilizes a liquid piston and for securing substantially isothermal compression (or expansion) subdivides the gaseous medium into thin sheets having a large surface of heat transfer contact with the liquid which acts as the compressing medium.

The apparatus of my invention avoids the use of reciprocating pistons, of mechanical intake and outlet valves, and other mechanical features of compressors and engines now in common use. It aims to avoid leakage of the gaseous medium and to obtain complete discharge of the compressed gaseous medium. All of the foregoing advantages are secured in an apparatus which is very simple both in construction and operation.

The accompanying drawings illustrate the method and apparatus of my invention as outlined in the following description. These drawings are necessarily more or less diagrammatic since many modifications in detail of design and arrangement are possible with the invention. I do not therefore desire to be limited by these drawings alone except as they illustrate the description and as they are interpreted in the claims.

Fig. I shows a section and plan on the line A—A of Fig. III, Fig. II a sectional elevation on the line C—C of Fig. III, and Fig. III a sectional elevation on the line B—B of Fig. II. Figures IV, V and VI show respectively a plan and sections on the lines D—D and E—E (of Fig. IV) of a preferred type of compressor cup. Fig. VII shows a diagram of the manner of connecting several machines in series to secure higher pressures. Fig. VIII and XI show diagrams of the manner of connecting the apparatus for refrigeration and heating. Fig. IX shows a method of feeding compressed gas to the device when it is used for power generation. Fig. X shows a design for using a single sprocket chain or belt.

The apparatus consists of two similar continuous sprocket chains (1) suspended between a pair of similar upper sprocket wheels (2) and a pair of similar lower sprocket wheels (3) carried respectively by an upper horizontal drive shaft (4) and a lower horizontal shaft (5). Suspended horizontally between corresponding parts of the two chains are a number of compression cups (6). As the sprocket wheels are rotated by the drive shaft (4) these cups are carried by the sprocket chains (1) through a continuous path over the upper shaft (4) down the vertical compression path to the lower shaft (5), beneath the lower shaft and up the opposite vertical portion of the path to the upper shaft, and so on continuously. This path through which the compression cups (6) are carried is enclosed in a suitable housing (7), which is filled with a liquid compression medium (L) up nearly to the upper shaft (4). The upper part of the chamber formed by the housing (7) above the liquid level (8) forms a closed gas chamber (9) into which the gas to be compressed is admitted through the inlet pipe (10). The compressed gas is discharged from the compression cups (6) as they travel through the lower part of the path around the lower shaft (5) into the receiver (11) from which the compressed gas may be withdrawn through the outlet pipe (12). The compressor cups (6) are preferably constructed and arranged as shown in Figs. IV to VI. The compressor cups (6) consist of shallow individual pans or cups (13) arranged in the form of a nest one above the other with relatively thin spaces (14) between them. These shallow individual pans (13) preferably have two opposite side flanges (16) which are sloped to the level of the bottom of the next pan so as to leave the openings (17) at each end of the pan through which gas and liquid may flow in and out of the compression spaces (14). The pans (13) are properly spaced by the separators (18) and are attached to the nest housing (19) by the bolts (20) which pass through holes in the housing (20) and in the pans (13) and separators (18). The nest housing (19) is attached at opposite ends to the two sprocket chains (1) by the bolts (21) which pass through the holes (22) in the links of the chains (1). Attached to the end of one (or both) of these bolts (21) is a double arm (23) with a roller (24) at each end arranged to move in the guides (25) so as to keep the pans (13) horizontal in the downward path of the pans and to tip them as desired in other portions of their path. The nests or cups (5) are attached to the sprocket chains so that the opening or concavity of the pans face downward in their downward path for compression and face downward in the upward path if the apparatus is used for expansion.

As will appear later, the construction of the compression (or expansion) pans so as to secure and maintain a thin layer of gas during compression (or expansion) is essential in order to secure substantially or approximately isothermal compression (or expansion). The large surface thus exposed for heat transfer and the short path for the gas molecules thus secured, make it possible to obtain this result which cannot be had with relatively large masses of gas which are exposed to a limited heat transfer surface and in which the path of the gas molecules between heat transfer surfaces is relatively long.

The foregoing is a general description of apparatus in which a great many details of arrangement and design may be changed without changing the essential parts of the invention. For example a variety of different chains or belts may be used to carry the compression cups. The chains or belts may be either double as shown or single if desired with compression cups (6) on one or preferably both sides of the chain (1) as shown in Fig. X, a design suitable for smaller forms of the apparatus. The housing (7) may be either a single vertical chamber or may have two separate vertical legs as shown in Figs. I to III. This housing or well (7) for holding the liquid compressing medium (L) through which the compressor cups (6) move may be a concrete shaft or housing of any suitable material in any appropriate place above or below the ground. For a single stage compression of air the housing (7) need not extend above the upper shaft (4). For applying a vacuum the upper part of the housing and inlet pipe (10) would be essential as they would also be in case of using the apparatus in a series for compression in stages. The compression pans or cups (6) may be of a wide variety of design depending upon whether the device is to be used for isothermal compression or not. Single relatively large cups may be used if it is not desired to approach isothermal compression. The nests of cups may either be attached to the bolt of the sprocket chain (1) as shown so that the pans (13) may be tipped into different positions by the guides (25) or may be fastened to the links of the chain (1) and held in fixed position by the chain. The chain (1) may be driven from either the upper or lower sprocket as desired though the preferred method is to drive from the upper shaft (4) by suitable gear, pulley or sheave (26). The driving motor may be installed within a part of the upper housing (27) if desired as indicated by the dotted lines in Figs. I to III so as to avoid packing glands. For high compression or compression of noxious or dangerous gases such arrangement would be preferred so as to prevent all leakage by avoiding all openings except those for ingress of gas to be compressed and egress of the compressed gas. This may be attained as shown by using closed end lower bearings (28) and upper bearing (29) and enclosing the driving motor in a special housing (shown dotted) (27) opening into the gas chamber (9) only through a suitable bearing and gland (30). In this way all possibility of leakage would be avoided. If desired, the compression pans (6) may be passed through their path in the liquid compressing medium without using chains or belts by driving them through suitable guides by means of suitable bull wheels or drive wheels engaging the cups at the top and bottom of the vertical path. Such arrangement, though compact, is not preferred on account of complication in design and probability of excessive friction.

For cooling the liquid compressing medium (or supplying heat when the apparatus is used as an expander) the housing (7) is supplied with jackets (31) surrounding the vertical paths of the cups or pans (6, 13) through the liquid medium. Through the jacket (31) a suitable cooling fluid (or warming medium) is circulated preferably in counter-current to the movement of the pans as indicated by the arrows, the cooling medium entering through the inlet pipe (50) and being discharged from the outlet pipe (51) (or, vice versa, the warming fluid in the apparatus used as an expander). This cooling (or heating) of the liquid compressing medium may be done by means of cooling pipes in the column of liquid compressing medium (L) arranged within the housing (7) or the liquid compressing medium (L) may be withdrawn from the housing (7) through the outflow pipe (52) and circulated through a counter-current heat interchanger and then returned to the housing (7) through the inlet pipe (53) (or vice versa for the apparatus used as an expander).

From the foregoing, it will be apparent that a wide variation in detail of design of the apparatus is possible without changing the main parts of the invention or the essential method of its operation and the drawings must therefore be regarded as illustrating rather than limiting the invention.

The method of operation of the apparatus is in general as follows. The drive shaft (4) is rotated a suitable rate by the application of power to the drive sheave or gear (26) thus carrying the compressor cups on the sprocket chains (1) through their path in the liquid compressing medium (L) as indicated by the arrow. As the compression cups or pans (6, 13) pass through the gas supply chamber (9) the gas (entering through the supply pipe (10)) fills the compression spaces (14) and is trapped by the liquid compressing medium (L) as the cups (6) or pans (13) pass down into liquid with the pans held in horizontal position with the edges down. As the cups (6) pass down through the liquid, the gas in the compression spaces (14) (i. e. in the concavity of the cup or pan) is subjected to the steadily increasing head of the liquid (L) which compresses the gas and moves into the lower part of the spaces (14) through the openings (17) as the gas decreases in volume. When the cups or pans (6, 13) reach the level of the lower shaft they begin to turn as shown and the compressed gas escapes from the inner opening (17) and pass upward into the compressed gas receiver (11). The cups (6, 13) with the compression spaces (14) filled with the compression liquid (L) continue around this path below the shaft (5) and up through their upward return path through the compressing liquid. Near the upper part of the vertical return part the pans are tipped slightly by the guides (25) and roller arm (23) and rollers (24) so as to discharge the fluid from the spaces (14) with the minimum of lift above the liquid level (8). In the gas space (9) the compression spaces (14) are again filled with gas to be trapped and compressed as previously described. It will be seen that the gas to be compressed is divided into thin layers with the liquid compressing medium both above and beneath. In this way a large gas surface is exposed to the cooling action of this liquid medium, on the under side in direct contact with the medium and on the upper side in heat interchange contact through the bottom of the pan, and a very short path for the gas molecules between the heat transfer surfaces is also secured. It will also be seen that as the gas decreases in volume due to compression, the layer of gas merely becomes thinner and there is no appreciable decrease in the heat transfer surface between the gas and the liquid compressing medium. As a result by constructing the pans of good heat conducting material and making the spaces (14) relatively thin and continuously withdrawing the heat of compression from the compressing liquid (L) by means of the cooling fluid in the jacket (30), or in an external cooling system, substantially isothermal compression of the gases may be secured, providing the rate of compression is not too great. The rate of compression may be regulated by the speed of the pans through the liquid compressing medium so as to secure the desired rate of compression and the desired approach to isothermal compression. The greatest value of my method and apparatus lies in the fact that by them substantially isothermal compression may be secured.

If the apparatus is to be used for expanding compressed gases i. e. for power generation, the direction of movement of the pans is reversed so that the pans move upward with their concavity facing downward and compressed gaseous medium is admitted to the expanding spaces (14) in regulated quantity and expands within the spaces (14)

as the pans move upward through the liquid medium (L). The compressed gas may be admitted to the spaces (14) in regulated amount by means of a rotating valve (35), as shown in Fig. IX, consisting of an external rotating part (36) rotating on the central fixed part (37). The moving part is supplied with the outlet pipe (38) projecting toward the pans at a suitable angle and the level arm (39). The tension spring (40) pulls the lever arm (30) back against the stop (41) when the rotor (36) is free to move under its pull. The discharge pipe (38) is pushed upward for a short distance by the inner edge of each individual pan (13) in its upward movement and as it slips over the edge of the pan is pulled back through the outer edge of the space (14) to the edge of the pan beneath by the spring and lever (39 and 40). The rotating part of the valve (36) has a port (42) connected with the outlet pipe (38) and the stationary part of the valve (37) has an outlet port (43). The valve is so arranged that the two ports meet during the upward and downward movement of the valve allowing the desired portion of compressed gas to escape from the outlet pipe (38) into the spaces (14).

If the apparatus is to be used for compression to relatively high pressures it is preferable to connect a number of the compressors in series as shown in diagram in Fig. VII, the size of the cups being decreased in successive compressors of the series directly as the volume of gas decreases in successive stages, or the number of compressors in parallel in each group or stage of the series being made directly proportional to the volume of gas to be compressed in that stage. The compressed gas from the first compressor (or group of compressors (A)) is passed from the receiver (11) through the connecting pipe (12) to the gas space (9) of the following compressor (or group) (B) and so on through the series. In this case, if the nature of the gas permits, the driving motor should be placed within the gas chamber (9) and closed-end bearings (28, 29) as previously described should be used in order to eliminate leakage and do away with packing glands.

This closed type of construction should also be used in case the apparatus is used for the production of a vacuum, the inlet pipe (10) being connected to the space to be exhausted and the driving motor being enclosed with the housing in the gas chamber (9).

It will be obvious that the apparatus may also be connected in reverse series to that of Fig. X if desired for the generation of power, the gas under pressure from the gas chamber (9) of the smaller, higher pressure member of the series being fed successively to the cups (6) or pans (13) of the next lower pressure member (or group) at the lower point of their upward journey through the liquid medium (L). By thus using the apparatus in series high pressure compression may be obtained and high pressure gases utilized without the need of excessively high liquid columns.

The manner of connecting and utilizing my invention for refrigerating or heating or both heating and cooling is shown diagrammatically in Fig. VIII. In this case, assuming that a gaseous working medium is utilized which may be condensed at the pressures used, the device would be arranged and operated as follows. The working medium, in gaseous form enters the gas chamber (9) through the inlet pipe (10) and is trapped and compressed by passage through the liquid compressing medium (L) and discharged by the compressor pans (6, 13) into the receiver (11). The cooling of the liquid medium (L) by the fluid in the jacket (31) is so regulated that the compression is substantially isothermal and the pressure such that the working medium in the receiver (11) is still in gaseous form. From the receiver (11) the gaseous medium passes to the condenser (45) through the outlet pipe (12) where it is condensed by counter current heat interchange contact with the cooling medium (c) (direction of flow is indicated by the arrows). From the condenser (45) the condensed liquid working medium is allowed to flow into the evaporator or refrigerator (46) through the regulating valve (47). The valve (19) automatically regulates the flow of liquid to the refrigerator or evaporator (46) so that the desired or suitable pressure is maintained in the refrigerator or evaporator. In the refrigerator the liquid working medium is evaporated and warmed by counter-current heat interchange with the warming medium (W) i. e., the medium to be cooled (direction of flow is indicated by the arrows). The evaporated gaseous working medium from the evaporator returns to the gas chamber (9) through the inlet pipe (10) and is recompressed again as described.

It will be apparent that by utilizing my invention in this manner a substantial saving in power as compared with other refrigerating systems is secured since the compression of the working medium may be substantially isothermal.

It will also be apparent that by using a liquid compressing medium (L) kept at a sufficiently lower temperature than the working medium that more than isothermal compression might be secured, i. e. the compressed gas may be discharged at a lower temperature than that at which it enters the compressor.

If the gaseous working medium is not liquefiable at the pressures used, my invention may be utilized for heating and cooling as diagrammatically illustrated in Figure XI.

In this case the gaseous working medium is compressed approximately isothermally in the compressor (C), the liquid compressing medium (L) being cooled by countercurrent circulation of suitable fluid medium (W), to be warmed, through the jacket (31) or through a suitable external counter-current heat interchanger. The compressed gas from the receiver (11) of the compressor (C) is passed through the counter-current heat interchanger (48) counter-current to the fluid cooling medium (c) and into the cups (6, 13) of the expander (E) at the lower part of their upward path through a suitable valve (35) in the manner shown in Figure IX. In passing upward through the liquid column (L) in the expander (E) the gaseous working medium expands and abstracts heat from the liquid medium (L) to which heat is supplied by circulating of a fluid warming medium from which heat is to be abstracted, through the jacket (31) or by counter-current circulation of the liquid (L) through a suitable external counter-current heat interchanger in heat interchange contact with medium (c). (The arrows indicate direction of flow or movement.) In this way the expansion of the gaseous working medium in (E) may be made substantially isothermal, and the power required for refrigerating or heating with entirely gaseous working media may be considerably reduced as compared with present methods.

A special application of my invention for the heating of buildings in summer using either of the last two methods of arranging and using my invention consists in heating the air circulated in the buildings through the jackets (31) of the compressor (C) or through the external heat interchangers in which the compressing liquids (L) is cooled and through the condensor (in the first case) and abstracting heat from a suitable free fluid medium, such as the external air or from water, by circulating this latter medium in heat interchange contact through the jackets (31) of the expander (E) (or through the evaporator E in the first case). In this way heat may be extracted from a relatively free source such as the atmosphere or a body of water and transferred to the air within the buildings at a relatively low cost. This method of heating buildings, originally suggested by Kelvin, has not received practical application on account of fact, that with methods and apparatus available up to the present time, the compression and expansion had to be carried out substantially adiabatically which decreased the efficiency of the cycle. However, with my method and apparatus such cycle is efficiently enough to warrant practical application where power is not too expensive and the temperature differences not too great. For ordinary temperate climates such a system of heating in which heat is abstracted from the outside air while its temperate is substantially above 0° C. and from water (by freezing it to ice) when the temperature drops below this point, offers an attractive field for practical use of my invention. The ice thus formed could be stored for use in summer so as to pay for the power utilized in the heating operation in winter.

The liquid compressing medium (L) used in my invention will be changed to suit the conditions of operation. For ordinary air compression, water or oil may be used, for compression of chlorine concentrated sulphuric acid may be used, for ammonia compression a suitable oil may be used. For small apparatus, such as small mechanical house refrigerators, mercury may be used with a working medium such as ethyl chloride so as to avoid the necessity for a high liquid column or a number of compressors in series. Heavy liquids or solutions or mixtures of heavy liquids with finely divided solids to make heavy fluid pulps may also be used to cut down the height of fluid column necessary to obtain any desired pressures. It will be apparent that a very wide variety of fluids may be used in my invention to suit the gases to be handled and the operating conditions.

From the foregoing, it will be apparent that my invention has a wide field of application under a variety of different conditions and that a very considerable variation in design and arrangement of the apparatus and of methods of use may be made without altering the more important elements of the invention. I do not therefore desire to be limited by the drawings alone except as they are illustrative of the invention and as they are interpreted in the claims.

I am aware that apparatus for compressing gases by the passage of gases in containers through liquid columns has previously been described and patented. These devices are, however, not proposed for or suited to the purposes of my invention as they make no provision for the cooling of the gases during compression (or their heating during expansion), which are essential features of my method and apparatus. I, therefore, make no claim to the general method or general type of apparatus for compressing (or expanding) gases by passing gases in containers through a liquid column, but claim only those specific applications of this general method and general type of apparatus in which special specific provisions for cooling (or heating) the gases during compression (or expansion) are made, as described in the foregoing specification and as specially covered in the appended claims.

Having described my invention, what I claim and desire to patent is:

1. The apparatus for compressing gases which consists of a series of nests of superimposed shallow compression pans attached at opposite ends to similar parallel endless carriers suspended between similar driving wheels on parallel upper and lower horizontal shafts placed substantially, one vertically above the other, a housing surrounding said pans, chains, wheels and shafts, a liquid medium filling said housing to a level beneath said upper shaft, a compressed gas receiving chamber above said lower shaft in said housing, means for supplying gas to be compressed to the space above said liquid in said housing, guide arms attached to said nests of pans and arranged to move in guides within said housing, all arranged so that when one of said shafts is rotated said chains carry said nests of pans over said upper shaft through said gas above said liquid, down through said liquid in said housing, beneath said lower shaft, up through said liquid in said housing out of said liquid and over said upper shaft again in continuous circuit, said compression pans being held in horizontal position with the opening downward when entering said liquid, so as to trap a thin layer of gas in said pans, and in passing down through said downward path in said liquid by said guide arms and guide, said compressed gas receiving chamber being arranged to catch the compressed gas discharged from said pans as they are tilted in passing through their path beneath said lower shaft.

2. The apparatus for compressing gases which consists of a series of nests of superimposed shallow compression pans attached at opposite ends to similar parallel endless carriers suspended between similar driving wheels on parallel upper and lower horizontal shafts placed substantially, one vertically above the other, a housing surrounding said pans, chains, wheels and shafts, a liquid medium filling said housing to a level beneath said upper shaft, a compressed gas receiving chamber above said lower shaft in said housing, means for supplying gas to be compressed to the space above said liquid in said housing, guide arms attached to said nests of pans and arranged to move in guides within said housing, all arranged so that when one of said shafts is rotated said chains carry said nests of pans over said upper shaft through said gas above said liquid in said housing, down through said liquid in said housing, beneath said lower shaft, up through said liquid in said housing out of said liquid and over said upper shaft again in continuous circuit, said compression pans being held in horizontal position with the opening downward when entering said liquid, so as to trap a thin layer of gas in said pans, and in passing down through said downward path in said liquid, by said guide arms and guide, said compressed gas receiving chamber being arranged to catch the compressed gas discharged from said pans as they are tilted in passing through their path beneath said lower shaft, and a heat transfer jacket in contact with said liquid medium arranged to abstract heat from said liquid medium by heat transfer to other fluid medium.

3. The apparatus for expanding gases for generation of power which consists of a series of nests of superimposed shallow pans attached at opposite ends to similar parallel endless carriers suspended between similar driving wheels on parallel upper and lower shafts placed substantially one vertically above the other, a housing surrounding said pans, chains, sprockets and shafts, a liquid medium filling said housing to a level beneath said upper shaft, guide arms attached to said pans and arranged to move in guides within said housing, all arranged so that when one of said shafts is rotated said chains carry said nests of pans up through said liquid in said housing over said upper shaft, down through said liquid in said housing, beneath said lower shaft and up through said liquid column again in continuous circuit, said pans being held in horizontal position with the opening downward in passing up through said upward path in said liquid by said guide arms and guide, means for feeding a regulated supply of compressed gas to said pans at the lower end of said upward path through said liquid.

4. The apparatus for expanding gas for generation of power which consists of a series of nests of superimposed shallow compression pans attached at opposite ends to similar parallel sprocket chains suspended between similar sprocket wheels on parallel upper and lower shafts placed substantially one vertically above the other, a housing surrounding said pans, chains, sprockets and shafts, a liquid medium filling said housing to a level beneath said upper shaft, guide arms attached to said pans and arranged to move in guides within said housing, all arranged so that when one of said shafts is rotated said chains carry said nests of pans up through said liquid in said housing over said upper shaft, down through said liquid in said housing, beneath said lower shaft and up through said liquid column again in continuous circuit, said pans being held in horizontal position with the opening downward in passing up through said upward path in said liquid by said guide arms and guide, means for feeding a regulated supply of compressed gas to said pans at the lower end of said upward path through said liquid, and a heat transfer jacket in contact with said liquid medium arranged to transfer heat to said liquid medium from other fluid medium.

5. In apparatus of the type described, in combination, a vertical chamber, said chamber being partly filled with a column of liquid; a plurality of pans, each of said pans having side flanges, the height of said flanges being substantially less than any dimension of the bottom of the pan, whereby a thin layer of gas is maintained in said pan when the pan is in horizontal inverted position; and carrier means for moving said pans through said column of liquid and maintaining them in a horizontal inverted relation to the chamber during a substantial portion of their travel therethrough.

In testimony whereof I have signed my name to this specification.

NIELS C. CHRISTENSEN.